May 8, 1962 M. R. JONES 3,033,224
VALVE
Filed Dec. 15, 1959 3 Sheets-Sheet 1

Marvin R. Jones
INVENTOR.

BY
Browning, Semmes, Hyer
& Eickenroht
ATTORNEYS

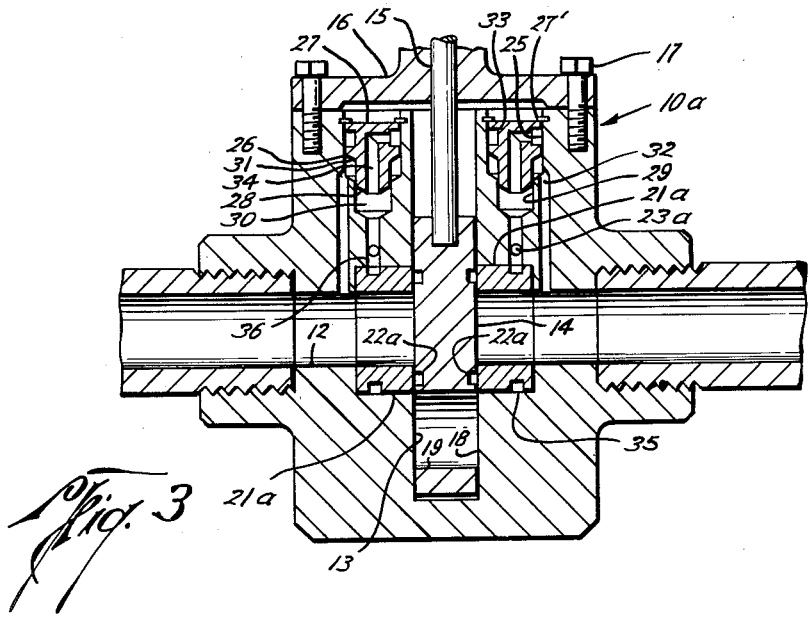
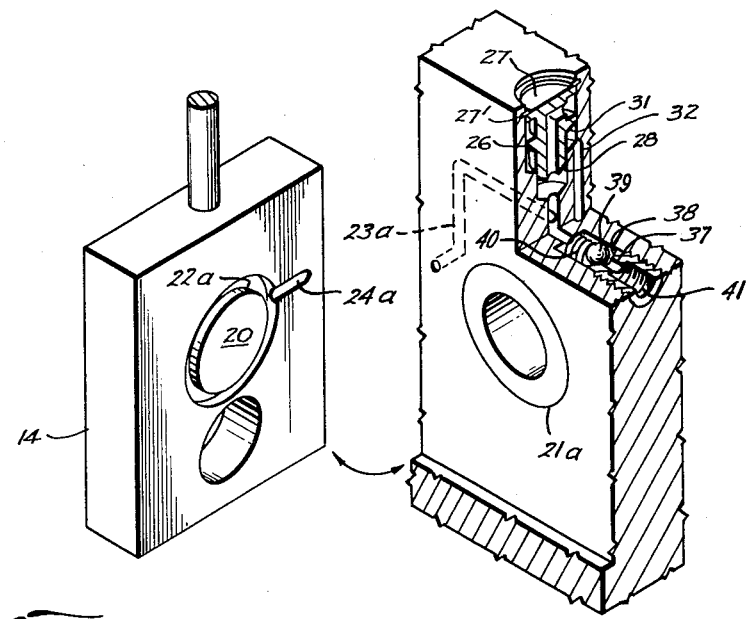

May 8, 1962 M. R. JONES 3,033,224
VALVE
Filed Dec. 15, 1959 3 Sheets-Sheet 3

Marvin R. Jones
INVENTOR.

BY
Browning, Simms, Hyer
& Eickenroht
ATTORNEYS

United States Patent Office 3,033,224
Patented May 8, 1962

3,033,224
VALVE
Marvin R. Jones, Houston, Tex., assignor to Cameron Iron Works, Inc., Houston, Tex., a corporation of Texas
Filed Dec. 15, 1959, Ser. No. 859,809
9 Claims. (Cl. 137—246.12)

This invention relates to improvements in valves of the type in which a sealant is contained within a groove which surrounds the flowway through the body at the interface between the downstream side of the valve member and valve body in the closed position of the valve member.

In such valves, the groove is usually formed in either the valve member or the valve body, and sealant is supplied thereto through a port in the other which connects with the groove in the closed position of the valve member. However, when the valve member moves in an opening direction and the sealant groove is uncovered, the port is disconnected from the groove to prevent an excessive loss of sealant.

Systems for supplying sealant to the groove include a piston within a cylinder communicating at one end with the fluid in the body cavity and at its opposite end with the sealant in a chamber connecting with the supply port. This causes the sealant to have a pressure at least substantially equal to that of the line fluid, because, of course, when the valve member is closed, line fluid which forces it against its downstream seat will escape past the upstream seat into the body cavity. However, the flow of sealant into the groove is dependent upon a drop in the pressure of the line fluid at the groove below that of the fluid within the body cavity, and this drop is not always enough to completely fill the groove with sealant.

An object of this invention is to provide a valve of this general type in which sealant will be at a pressure exceeding that of the fluid to be contained, in the closed position of the valve member, so as to fill the groove without, at the same time, causing excessive sealant loss upon opening of the valve.

This and other objects are accomplished, in accordance with the present invention, by a valve of the type above-described in which the end of the piston opposite the end thereof exposed to body cavity pressure has first and second pressure responsive areas thereon forming a sealant supply chamber and communicating with the flowway on the downstream side of the valve body, respectively, the sum of these areas at least approximately equaling the pressure responsive area of the end exposed to body cavity pressure. Thus, when the valve member is closed, there is a pressure differential acting over the second pressure responsive end area which raises the pressure of the sealant in the supply chamber above that of the fluid being contained. However, since this pressure differential decreases as the valve member is moved to open position, the sealant pressure decreases proportionately until it is at least substantially equal to the line pressure when the valve is fully opened.

Other objects, advantages and features of this invention will be apparent to one skilled in the art upon a consideration of the written specification, the attached claims and the annexed drawings.

Although, for purposes of illustration, the valves shown in the drawings described below are gate valves, it will be understood that the invention is also applicable to other types of valves such as rotary plug valves in which, for example, the valve member is cylindrically, conically or ball shaped.

In the drawings, wherein like reference characters are used throughout to designate like parts:

FIG. 3 is a cross-sectional view of another embodiment of a gate valve constructed in accordance with the present invention, and similar in many respects to the embodiment of FIGS. 1 and 2, but with the sealant groove formed on the gate;

FIG. 4 is a perspective view similar to FIG. 2 of the gate and part of the valve body of FIG. 3, but also showing a means for adding sealant to the supply chamber from the exterior of the body;

Figure 2:
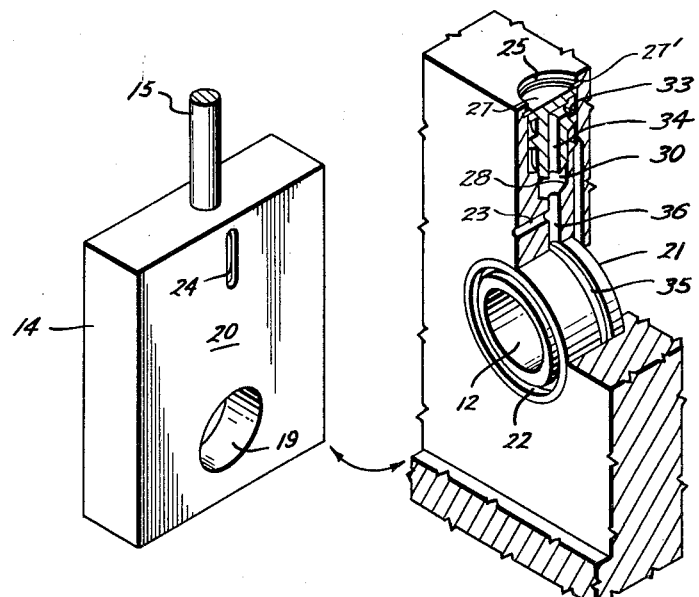
FIG. 2 is a perspective view of the gate and part of the valve body of FIG. 1, with the gate swung approximately 90° out of its normal position and the body part broken away to illustrate details of the means for supplying sealant to the groove from a supply chamber in the valve body.
Figure 5:
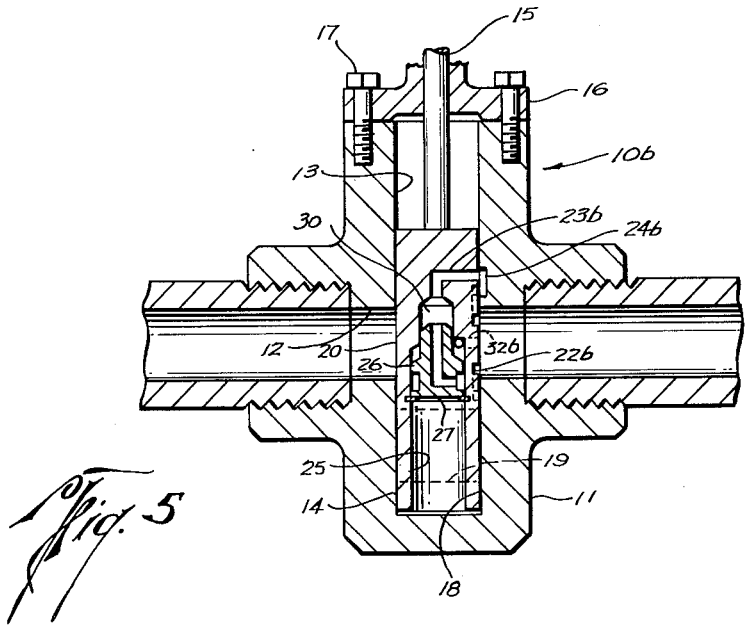
Figure 6:
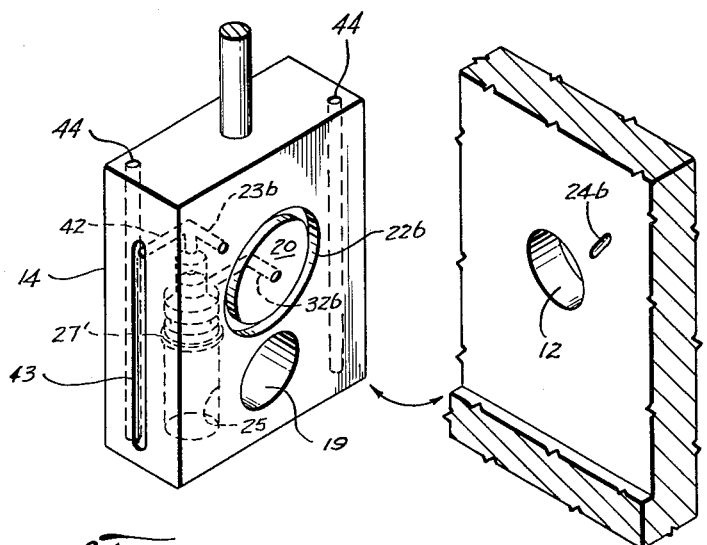

FIG. 5 is a cross-sectional view of still another embodiment of a valve constructed in accordance with the present invention, and similar to the embodiment of FIGS. 3 and 4 in that it has the sealant groove formed on the gate, but differing therefrom in that the sealant chamber is in the gate; and FIG. 6 is a perspective view, similar to FIGS. 2 and 4, of the gate and part of the valve body of FIG. 5, the means for supplying sealant to the groove being shown in broken lines.

Figure 1:
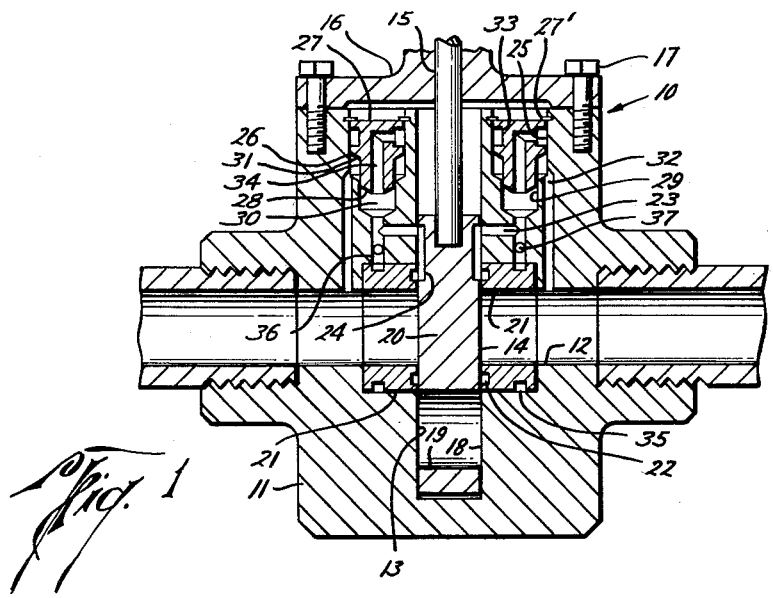
FIG. 1 is a cross-sectional view of one embodiment of a gate valve constructed in accordance with the present invention, wherein a groove is formed on the valve body to contain a sealant for sealing about the flowway between the body and the downstream side of the gate in its closed position.

With reference now to the details of the above-described drawings, the valve shown in FIGS. 1 and 2, and designated in its entirety by reference character 10, comprises a body 11 having a flowway 12 therethrough and a cavity 13 therein intersecting the flowway and opening onto the upper end of the body. A gate 14 is connected to the lower end of a stem 15 for sliding longitudinally within the cavity 13 to open and close the flowway through the valve body. This stem is received through the upper end of a bonnet 16 connected as by bolts 17 across the open upper end of the cavity. More particularly, the upper end of the stem 15 is connected to suitable apparatus (not shown) on the bonnet for imparting reciprocatory movement to it in opening and closing the gate.

The body cavity 13 includes a well 18 which extends downwardly from the flowway to receive the lower end of the gate in its closed position. More particularly, the gate is of the conduit type having an opening 19 therethrough and a solid portion 20 above the opening. When the gate is in the lower closed position, as shown in FIG. 1, its solid portion is disposed across the flowway 12 of the body to close same; and, when the gate is raised to its upper position, the opening 19 through it is aligned with the flowway 12 to open same.

The inner end of the flowway through the valve body at each side of the cavity 13 is formed by a seat 21. As shown in FIG. 1, these seats are removably received within counterbored portions of the remainder of the valve body to form smooth continuations of the flowway.

In the valve embodied in FIGS. 1 and 2, a groove 22 is formed in the inner face of each seat to surround the flowway therethrough. Thus, when the gate 14 is moved to the closed position of FIG. 1, a seating surface on the solid portion of both sides thereof will be disposed opposite the groove 22 in each of the seats. It will be understood, of course, that this portion of the valve body in which the grooves 22 are formed need not necessarily comprise removable seats. That is, as illustrated in another embodiment of the invention, such grooves may be formed in a part of the valve body which is integral with the remainder thereof.

Sealant is supplied to each groove 22 by means of a passage 23 formed in the valve body and having a port opening onto the body cavity at the side thereof adjacent the groove in the seat on the same side. This port is, in turn, connected to its groove, in the closed position of the gate, by a groove 24 in the gate, as best shown in FIG. 1. As can be seen, however, this groove 24 extends a length just sufficient to connect the passage and groove 22 in the closed position of the gate, so that when the gate is moved upwardly in an opening direction, the lower end of groove 24 moves above the groove 22 so as to disconnect the passage and groove. As previously mentioned, this prevents the excessive loss of sealant as the opening 19 through the gate moves upwardly to a position in which it uncovers the grooves 22 to line fluid.

A cylinder 25 formed in the valve body on each side of the cavity therein connects the body cavity with the sealant passage 23, and receives a piston 26 for reciprocation longitudinally thereof. The upper end 27 of this piston, which is exposed to the pressure of the fluid in the body cavity, is limited in its movement in an upward direction by means of a snap ring 27'. The opposite end of the piston 26 has a first pressure responsive area 28 slidable within a reduced diameter portion 29 of the cylinder to form a sealant chamber 30. A second annular pressure responsive area 31 on the lower end of the piston which surrounds the first area 28 equals the difference between the pressure responsive area of the end 27 and the first pressure responsive area 28, and is connected by a passage 32 in the valve body to the flowway 12 on the side of the gate adjacent the groove 22 to be supplied by the chamber 30 beneath the piston.

As will be apparent from the foregoing, when the gate is closed, line fluid leaks past the upstream interface between the valve member and valve body and acts over the upper end 27 of each piston to urge it downwardly against the sealant within the chamber 30 beneath it. In the case of the sealant system on the downstream side of the gate, the force due to this pressure is opposed by the pressure of the sealant in the chamber 30 acting over the first pressure responsive area 28 as well as by downstream pressure acting over the second pressure responsive area 31. Since these two areas of the piston equal the area of the end 27 of the piston, the pressure differential across the closed gate and thus across area 31 raises the pressure of the sealant above that of the line fluid in the body cavity. Thus, the areas 28 and 31 may be proportioned to provide an excess of sealant pressure over line pressure sufficient to fill the groove with sealant under all operating conditions. However, when the gate moves in an opening direction, and the pressure drop across it decreases, the pressure differential across the piston area 31, and thus the pressure of the sealant, decreases accordingly until there is no pressure drop and the sealant pressure is substantially the same as the pressure of the line fluid.

On the other hand, since the passage 32 connects the area 31 of the piston of the upstream sealant system with line fluid, there is no such pressure differential across the piston and the sealant in its chamber is at a pressure at least substantially equal to the line or upstream pressure. Thus, the second sealant system including the groove 22 on the upstream side of the gate serves no particular purpose except upon reversal of flow through the valve, in which case it would become the downstream system.

In accordance with an additional novel aspect of the invention, the upper enlarged end of the piston 26 of each system is sealed with respect to the cylinder 25 during its reciprocation therein by means of a groove 33 about the piston which is filled with sealant from the chamber 30 beneath it by means of a passage 34 extending axially and then laterally of the piston, as shown in FIG. 1. In accordance with a still further novel aspect of this invention, each removable seat 21 is provided with a groove 35 about its outer periphery to also receive sealant from the chamber 30 of each system by means of a passage 36 connecting the lower end of the chamber 30 with the groove, as shown in each of FIGS. 1 and 2. This, of course, prevents the leakage of line fluid through the separation between the seat and the recess in the remainder of the valve body in which the seat is received.

Sealant may be added to the chamber 30 of each system by means of a passage 37 in the valve body connecting the chamber 30 with the exterior of the body, which passage, as shown in FIG. 4, has an enlarged inner portion forming a seat 38 upon which a ball valve member 39 is seated. More particularly, a coil spring 40 in this portion of the passage 37 urges the ball outwardly to engage the seat 38 for normally closing the passage. However, the outer end of the passage is threaded at 41 to receive a fitting of a type well known in the art for depressing the ball to open the passage and then supplying sealant thereto. Upon withdrawal of the fitting, however, the ball is urged back into seated position by means of the spring 40 so that the sealant is prevented from escaping from the chamber during normal operation of the valve.

Since the valve embodiment shown in FIGS. 3 and 4, and indicated in its entirety by reference character 10a, corresponds in so many respects to that above described in connection with FIGS. 1 and 2, most of its parts carry the same reference characters. Noting the differences, however, between this embodiment and the one previously described, a groove 22a is formed on each side of the solid portion 20 of the gate 14 for surrounding the flowway 12 through the body in the closed position of the gate. More particularly, in such position of the gate, the grooves 22a are disposed opposite seating surfaces on the flat inner ends of removable seats 21 to contain a sealant which is supplied thereto in a manner to be described hereinafter.

As shown by broken lines in FIG. 4, a passage 23a connects at one end with the sealant chamber 30 of each system and, at its other end, opens onto the body cavity to one lateral side of the removable seat 21a which faces the groove 22a of such system. More particularly, the open end of the passage 23a connects, in the closed position of the gate, with the outer end of a groove 24a extending laterally from the side of sealant groove 22a in the gate at a point disposed laterally outside the path of movement of the groove 22a. Thus, as the gate moves upwardly in an opening direction, the passage 23a is disconnected from the sealant groove 22a until the gate is returned to closed position.

Since the construction and function of the system shown in FIGS. 3 and 4 for supplying sealant to each groove 22a is identical to that previously described in connection with the supplying of sealant to each groove 22, they need not be repeated herein. This is also true of that portion of the system which supplies sealant to the grooves 33 and 35 which surround the piston and removable seat 21a, respectively.

Referring now to the embodiment of the gate valve shown in FIGS. 5 and 6, which is indicated in its entirety by reference character 10b, a gate 14 is connected to the lower end of a valve stem 15 for longitudinal reciprocation within a cavity 13 in a valve body 11 for opening and closing a flowway 12 therethrough, similarly to the corresponding parts of the valves illustrated in FIGS. 1 to 4. Noting other similarities, the stem 15 extends through a bonnet 16 connected as by bolts 17 to the upper open end of the cavity 13 for connection to suitable apparatus (not shown) on the bonnet for reciprocating it. More particularly, the cavity includes a well 18 to receive the lower end of the gate in its closed position, as shown in FIG. 5, and the gate is provided with an opening 19 therethrough and a solid portion 20 above the opening for alignment with the flowway 12 to open and close same, respectively.

As previously mentioned, a groove 22b is formed on the downstream side of the gate (assuming flow is from left to right) for disposal opposite a seating surface on the valve body which surrounds the flowway 12 in the closed position of the gate. In this respect, it will be noted that the portion of body on which this seating surface is formed is integral with the remainder thereof, as distinguished from the embodiment of FIGS. 3 and 4, wherein the seating surface is formed on a removable seat. As also distinguished from the previously described valves, the valve 10b has only a single sealing system for supplying sealant to a single groove 22b on one side of the gate. Obviously, however, the valve could be adapted for reversible flow merely by duplicating the system to seal the interface between both sides of the gate and valve body.

Similarly to those of the other embodiments, this sealant system includes a cylinder 25 formed in the gate to connect the body cavity with a sealant passage 23b also formed in the gate and opening onto its downstream side, and a piston 26 is received within the cylinder for reciprocation longitudinally thereof. Also, one end 27 of the piston is exposed to the line pressure within the body cavity, and the opposite end thereof has a first pressure responsive area 28 reciprocable within a reduced diameter portion 29 of the cylinder to form a sealant chamber 30 and a second annular pressure responsive area 31 which communicates with the flowway 12 on the downstream side of the gate through a passage in the gate. More particularly, and as best shown in FIG. 6, this passage which is shown at 32b has a port which opens onto the downstream side of the gate concentrically within the groove 22b. Since the total of the pressure responsive areas 28 and 31 is equal to the pressure responsive area of the end 27 of the piston, the sealant within chamber 30 will be at a pressure higher than line pressure in the closed position of the gate, as previously described.

The sealant is supplied from the port in the passage 23b to the groove 22b by means of a groove 24b in the body which connects the groove and port in the closed position of the gate. However, as the gate moves upwardly in an opening direction, the sealant chamber is disconnected from the groove 22b as the port of the passage 23b moves above the groove 24b in the valve body. Thus, as in the case of the previously described embodiments, there will not be excessive sealant loss during opening movement of the gate.

Sealant may be added to the chamber 30b through a passage 42 in the gate extending laterally from the chamber to a vertically extending groove 43 on one lateral side edge of the gate. This groove is aligned for connection with a filling passage (not shown) in the valve body in any position of the gate during opening and closing. Normally, the gate 14 will fit closely within the cavity 13 to insure such alignment, so that it is necessary to provide one or more by-passes 44 connecting the upper and lower ends of the gate for the free flow of fluid during opening and closing of the valve.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Valve apparatus, comprising a body having a flowway therethrough and a cavity therein intersecting the flowway, a valve member mounted on the body for movement within the cavity to open and close the flowway, a sealant groove surrounding the flowway on one side of said cavity at the interface between the valve member in its closed position and the valve body, a cylinder in one of said valve body or valve member having a piston longitudinally reciprocable therein and communicating at one end with the body cavity, one opposite end of the piston having a first pressure responsive area forming a sealant chamber within said cylinder and a second pressure responsive area communicating with the flowway on the one side of the body cavity, the total of said first and second pressure responsive areas at least approximately equaling the pressure responsive area of said one end of the piston, and means connecting the sealant chamber with the sealant groove in the closed position of the valve member and disconnecting said chamber from said groove upon movement of the valve member toward opened position.

2. Valve apparatus of the character defined in claim 1, wherein the sealant groove is in the valve body.

3. Valve apparatus of the character defined in claim 1, wherein the sealant groove is in the valve member.

4. Valve apparatus, comprising a body having a flowway therethrough and a cavity therein intersecting the flowway, a valve member mounted on the body for movement within the cavity to open and close the flowway, a sealant groove surrounding the flowway at the interface between the valve body and the downstream side of the valve member in its closed position, a cylinder in one of said valve body or valve member having a piston longitudinally reciprocable therein, one end of the piston communicating with the body cavity and the opposite end thereof having first and second pressure responsive areas forming a sealant chamber within said cylinder and communicating with the flowway on said downstream side of the valve member, respectively, the first pressure responsive area being smaller than the pressure responsive area of the one end of the piston and the second pressure responsive area being at least approximately equal to the difference therebetween, and means connecting the sealant chamber with the sealant groove in the closed position of the valve member and disconnecting said chamber from said groove upon movement of the valve member toward open position.

5. Valve apparatus of the character defined in claim 4, including a groove surrounding the piston and connected with the sealant chamber for sealing between the piston and cylinder intermediate the piston's communication with the cavity and the downstream flowway.

6. Valve apparatus of the character defined in claim 4, wherein said body includes a removable seat forming the flowway therethrough on the downstream side of the valve member and having a sealant groove about its outer periphery connected with the sealant chamber.

7. Valve apparatus of the character defined in claim 6, wherein the sealant groove surrounding the flowway is in the end face of the seat.

8. A valve, comprising a body having a flowway therethrough and a cavity therein intersecting the flowway, a valve member mounted on the body for movement within the cavity to open and close the flowway, a sealant groove surrounding the flowway at the interface between the valve member in its closed position and the valve body at the intersection of the flowway with the downstream side of the cavity, a cylinder in the body having a piston longitudinally reciprocable therein, one end of the piston being exposed to the body cavity pressure and a part of the oppositely facing end thereof forming a sealant chamber within said cylinder, a passage in the valve body connecting the sealant chamber with the body cavity, a groove in the valve member connecting the passage and sealant groove in the closed position of the valve member and disconnecting them upon opening movement of the valve member, and another passage in the body connecting another part of said oppositely facing end of the piston with the flowway on the downstream side of the body cavity, said parts of the oppositely facing end of the piston providing a total pressure responsive area at least approximately equal to that of said one end of the poston.

9. A valve, comprising a body having a flowway therethrough and a cavity therein intersecting the flowway, a valve member mounted on the body for movement within the cavity to open and close the flowway, a sealant groove surrounding the flowway at the interface between the valve body and the downstream side of the valve member in its closed position, a cylinder in the valve member having a piston longitudinally reciprocable therein, said piston having one end communicating with the body cavity and a part of its oppositely facing end forming a sealant chamber within said cylinder, means including a valve member connecting the sealant chamber with the sealant groove in the closed position of the valve member and disconnecting them upon opening movement of said valve member, and another passage in the valve member connecting with another part of the oppositely facing end of the piston and opening onto the downstream side of the valve member within the sealant groove in the closed position of said valve member, said parts of the oppositely facing end of the piston providing a total pressure responsive area at least approximately equal to that of said one end of the piston.

References Cited in the file of this patent
UNITED STATES PATENTS

| | | |
|---|---|---|
| 2,187,926 | Aikman | Jan. 23, 1940 |
| 2,299,517 | Volpin | Oct. 20, 1942 |
| 2,360,599 | Volpin | Oct. 17, 1944 |
| 2,433,638 | Volpin | Dec. 30, 1947 |
| 2,572,894 | Volpin | Oct. 30, 1951 |
| 2,710,017 | Carter | June 7, 1955 |
| 2,842,153 | Volpin | July 8, 1958 |